Dec. 12, 1967 W. D. CORNELL 3,357,300
PRINTABLE MATERIAL AND PROJECTION SYSTEM
Filed March 11, 1964 2 Sheets-Sheet 1
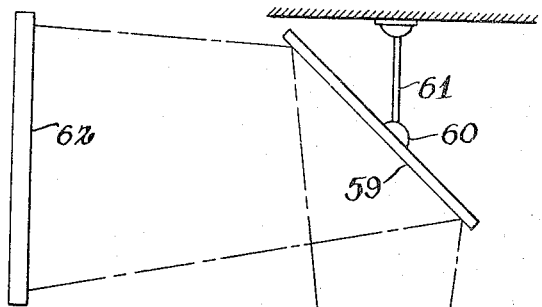
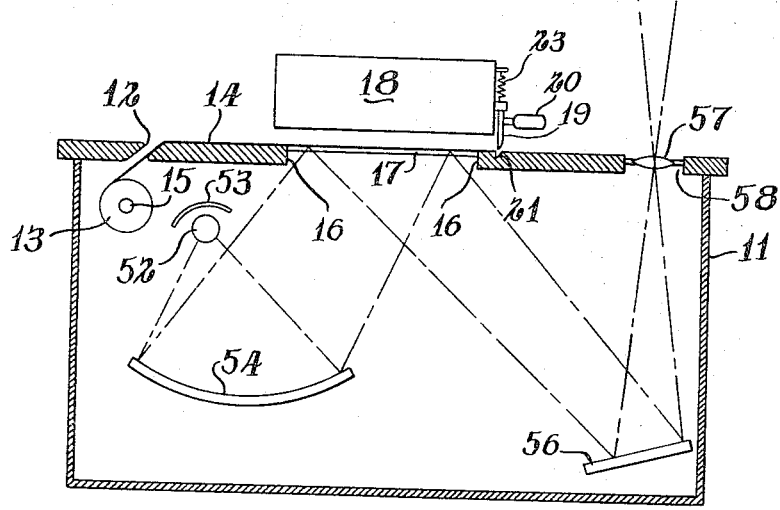
INVENTOR.
WILLIAM D. CORNELL
BY Hofgren, Wegner,
Allen, Stellman & McCord
Attys.

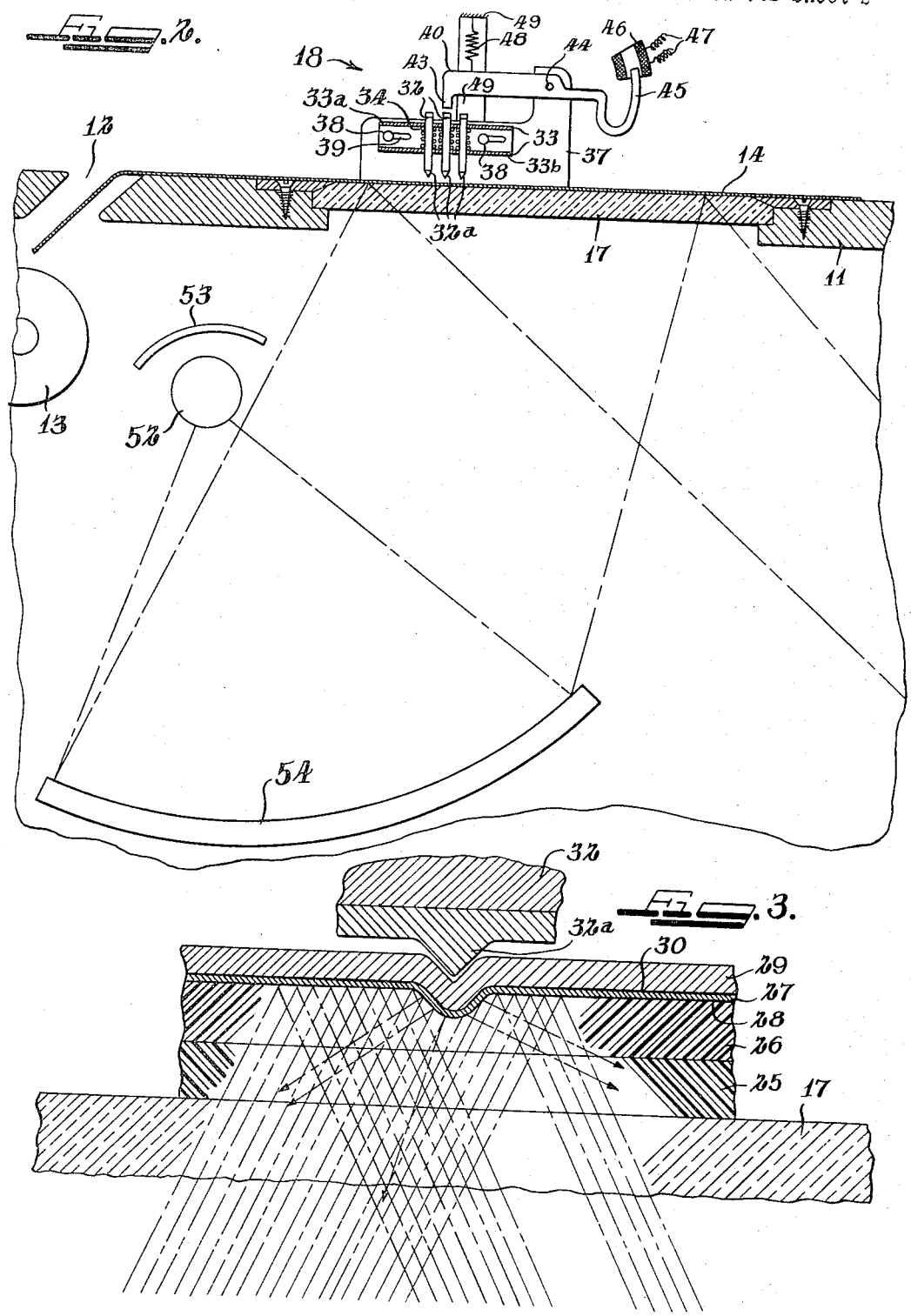

United States Patent Office

3,357,300
Patented Dec. 12, 1967

3,357,300
PRINTABLE MATERIAL AND PROJECTION SYSTEM
William D. Cornell, Grand Haven, Mich., assignor to Brunswick Corporation, a corporation of Delaware
Filed Mar. 11, 1964, Ser. No. 350,955
20 Claims. (Cl. 88—24)

This invention relates to a material which can be printed or impressed with indicia which can be projected to a viewing screen and to a projection system utilizing a reflective surface as an image source for projection of an image to a viewing screen. More particularly, this invention relates to such a material and such a projection system useful for projecting or viewing bowling score information.

Recently, attention has been directed to the development of a system which is capable of printing bowling game score information for both a permanent and a projected or temporary record. As a portion of such a system, it is important to provide for the production of a permanent printed bowling score record and further to provide for the projection of the bowling score information to a viewing screen. The viewing screen is usually positioned so that reference may be made thereto by bowlers and spectators during a bowling game for obtaining a given bowler's status with respect to scoring at any time during the game.

It has been customary to utilize transmitted light for projection of bowling score information. One of the principal problems in the use of many of the transmitted light projectors is the lack of a provision for continuously projecting an image onto a viewing screen while altering or adding to the image in a manner such that the printing means is concealed from the viewer. In a bowling game, for example, it is important to obtain projection of the image of the bowling score as soon as possible after the score is available, e.g. immediately after or at the time the score is computed and recorded on a score sheet, and preferably concurrently with the recording of the score on the score sheet. The image on the viewing screen should not be discontinued while printing or adding to an image source. Nor should the image on the screen be interrupted by the appearance on the screen of an image of the printing mechanism or the score recorder's hand or a shadow thereof which may obscure or detract from the image of the score on the screen.

It is a general object of this invention to provide a new and useful recording material from which recorded information may be projected to a viewing screen.

Another object of this invention is to provide a projection system utilizing such a recording material.

A more particular object of this invention is to provide a new and useful printable material and a projection or viewing means adapted to use such printable material for overcoming problems often associated with prior systems as discussed above and particularly useful in the printing and continuous projecting of bowling scores.

As one aspect of the present invention, there is provided a pressure printable sheet comprising a pressure deformable backing sheet and a pliable or deformable print-receiving reflective surface which is deformed under printing pressure. The reflective surface may be used as an image source in a projection system for projecting printed indicia to a viewing screen by reflecting the image from the surface and directing the reflected image to the screen in a properly oriented fashion.

An additional object is to provide a new and useful projecting method in which the printable material or projection system of any of the foregoing objects may be employed.

Other objects of this invention will be apparent to those in the art from the following descriptions and the drawings, in which:

FIGURE 1 is a diagrammatic illustration of the layout of a system employing the principles of the present invention;

FIGURE 2 is an enlarged portion of FIGURE 1 with the printer cover removed to show greater detail; and FIGURE 3 is an enlarged section through a portion of a printing stylus, printable web and glass backing surface as would be included in the system of FIGURES 1 and 2, with the printing stylus disposed in position immediately after impressing the surface of the printable web therebelow.

While an illustrative embodiment of the present invention is shown in the drawings and will herein be described in detail, the invention is susceptible of embodiment in many different forms, and it should be understood that the present disclosure is to be considered as an exemplification of the principles of the invention and is not intended to limit the scope to the embodiment illustrated.

It is contemplated that the projection or viewing apparatus of the present invention can be utilized in connection with one or more bowling lanes, e.g. by placement at the bowler's end of a bowling lane or plurality of adjacent bowling lanes, and that such bowling lane or bowling lanes may be equipped with automatic pinsetting and ball-return equipment of conventional design such as are presently in use. Further, the bowling lane or bowling lanes may be equipped with automatic score computing apparatus having a mechanical printing output which may be disposed above the projection system of the present invention for printing directly on the printable material in lieu of the printing means schematically shown in the figures.

Referring now to the drawings and especially to FIGURE 1, the illustrated form of projection system includes a casing 11 having a laterally extending slot 12 in the upper wall thereof. A supply or roll 13 of a printable material, such as flexible web 14, is pivotally mounted in casing 11 for rotation about its axis 15, and web 14 projects through slot 12. Roll 13 may be stored until needed for use with its free end releasably secured to prevent premature unwinding. With the device in condition for operation the web 14 extends across a rectangular opening 16 in the upper cabinet wall defining a light-receiving station in the top wall of casing 11. A transparent plate 17 of glass or the like is mounted across opening 16 spanning the opening and providing a continuous surface with the top outer surface of casing 11 for supporting or backing the flexible web 14.

A printing mechanism 18 is mounted by suitable means (not shown) in a position spaced from and above the light-receiving station 16, permitting sufficient space between plate 17 and printing mechanism 18 for threading the end of web 14 from roll 13 through slot 12 and between plate 17 and printing mechanism 18.

Slidably attached to the distant end of printer 18 with respect to the feeding of web 14 across opening 16 is a vertically slidably mounted blade 19 having an outwardly projecting handle 20 secured thereto. In the top wall of casing 11 there is defined a depression 21 for receiving blade 19 when blade 19 is urged downward by handle 20. A spring return is provided for blade 19 in the upward direction in the form of tension spring 23 between blade 19 and the casing of printer 18. Depression or groove 21 includes a cutting edge 22 for cooperation with the cutting edge of blade 19 when blade 19 is pushed into depression 21 for cutting portions of web 14 e.g. used portions, that have been pulled beyond the light-receiving station 16.

Turning now especially to FIGURE 3, web 14 in its illustrated form includes a solid hard plastic layer 25 which may be of ethyl cellulose or other hard transparent or light-transmitting material. Secured to layer 25 is a solid deformable plastic layer 26 which is also transparent and may be of a plasticized or modified ethyl cellulose or the like. Layers 25 and 26 may be prepared, for example, by knife coating a layer of ethyl cellulose on a drum with a doctor blade to form layer 25 and thereafter knife coating a layer of plasticized ethyl cellulose thereover to form layer 26 in adherence with layer 25.

Over the transparent laminate of layers 25 and 26, there is provided a solid deformable or pliable reflective layer 27 having a deformable surface 28, internally reflective relative to the transparent layers 25 and 26. Layer 27 is backed directly by the deformable layer 26 which surface 28 faces. The reflective layer 27 may be of aluminum or other metal, e.g. vapor-plated on the layer 26 therebeneath by subjecting layer 26 to the presence of vapors from molten aluminum under vacuum. Alternatively, layer 27 may comprise a sheet of reflective metal, e.g. aluminum, of foil thickness or even thicker, if desired, or may be a very thin film or coating applied to layer 26 from solution, suspension or the like.

Over layer 27, and preferably bonded thereto by a suitable adhesive 30, is a layer 29 of printable material forming a printable exposed surface. The printable layer 29 is capable of receiving and permanently retaining indicia printed thereon as a permanent record, and may be, for example, ordinary printing paper and may be printed upon with inked type, or with a pencil, etc. However, it is preferred that layer 29 be of the self-marking-type or pressure-sensitive-record-material-type, i.e. a material capable of producing a mark on the surface responsive to pressure applied to its surface. Such materials are well known in the art and are available commercially.

Preferably, layer 29 is releasably secured to layer 27 so that layer 29 can be separated from the remainder of web 14 after printing. For this purpose, adhesive 30 may advantageously be a pressure-sensitive adhesive applied only along one edge of web 14 between layers 27 and 29 for maintaining proper registry of layers during printing.

The pressure-sensitive printable layer 29 may be advantageously of the encapsulated printing fluid type having pressure rupturable capsules of printing fluid contained within layer 29 and more usually having an absorbent material, e.g. a paper matrix, embedding the capsules for absorption of the printing fluid upon rupture of the capsules. The capsules are ruptured by application of pressure to the surface of the record material. The printing fluids contained within the capsules may be, for example, inks, dyes, pigment solutions or suspension or the like, which may be included, for example, within an opaque rupturable capsule or within a capsule surrounded by an opaque fibrous material precluding visual observation of the printing fluid until the capsule is ruptured and the printing fluid is absorbed by the absorbent material. Such pressure-sensitive sheets may be used singly or in manifold form, e.g. with the laminate of reflective material and deformable backing forming the last or backing sheet of the manifold. Suitable pressure-sensitive record sheets are available as "NCR" paper, as marketed by National Cash Register Company.

The structure of web 14 is preferably sufficient to provide flexibility in the web in the illustrated form, each of layers 25, 26, 27 and 29 being of a flexible material or flexible thickness. The structure may be formed in the usual manner for bonding layers together in laminate structures, e.g. by adhesives, heat seal, extrusion coating of one layer on the next, solution coating or the like. It is desired to retain transparency in all layers on the reflecting surface 28 side of the reflective material 27. If adhesives are used to bond layers in this portion of the laminate the adhesives should be a transparent or light-transmitting adhesive.

As a more particular illustration of the formation of a printable material like that shown in FIGURE 3, a layer of soft indentable material 26 such as a soft or plasticized ethyl cellulose is knife-coated over a layer of hard material in the form of a sheet 25 of ethyl cellulose.

The exposed surface of the plasticized ethyl cellulose 26 is then vapor-plated with a layer of aluminum 27. A coat of adhesive 30 is applied along one edge of the exposed surface of layer 27 and a sheet 29 of NCR self-marking paper is bonded by the adhesive to layer 27.

FIGURE 3 illustrates a preferred form of the laminate structure. However, it is to be understood that any form in which an internally reflective surface 28 is provided on a soft deformable material such as at 26 may be used. The hard backing material 25 can be included to support the structures thereabove and minimize the transmission of pressure or striking force from a printing stylus through the entire laminate, e.g. to a glass surface 17 therebelow. It also provides strength to the lay up and is more resistant to objectionable scratching than the soft layer. The layer of printable material 29 can be used in the laminate for the purpose of permitting a permanent easily legible record of any markings pressure-transferred to the layers therebelow and especially to the deformable internally reflective surface 28. The platen should be coated on both upper and lower surfaces with a low reflection coating to minimize reflections at the glass surfaces. Obviously, precut sheets may be used instead of a long web as at 14.

The hard and soft plastic layers 25 and 26 should have the same index of refraction and it should be the same as that for glass platen 17.

Turning to FIGURE 2, the printing mechanism 18 provided in the illustrated embodiment for applying printing pressure to surface 29 includes a plurality of type slugs 32 each vertically slidably mounted through registering apertures in the top and bottom walls 33a and 33b of a rectangular tubular mounting member or type-holding member 33 which may be of tubular form. Each slug 32 includes a spring grounding plate in the form of an annular ring 34 secured to the outer surface of the type slug, e.g. by force fit.

A spring 35 bears between each plate 34 and the bottom inner wall 33b of member 33. The type mounting tube 33 is longitudinally slidably mounted on frame 37 of the printer 18 by means of pins 38 secured at each end to frame 37 and projecting through elongate slots 39 in member 33, slots 39 being slidable over pins 38. The longitudinal slidable mounting of tube 33 permits the positioning of any one of the type slugs 32 beneath the impact head 43 of a print hammer 40.

The printing ends of slugs 32 are shown at 32a and each slug may include, as the end 32a, a printing type of a different numeral or other indicia. Although only three type slugs 32 are shown in FIGURE 2, it is to be understood that a greater plurality of types slugs may be used. For example, a set of type slugs or a plurality of parallel sets of type slugs, in which each set is capable of printing numerals of from 0 to 9 plus indications for fouls, spares and strikes, may be used in the printing device. Such type slugs may be provided as the output from a scoring device for automatically scoring bowling games.

Hammer 40 is pivotally mounted at 44 to frame 37 and includes a curved arm 45 which, with solenoid coil 46 comprises an electrically energizable solenoid, energizable by completion of electrical circuitry from a power source to line 47. In operation of the print hammer, energization of solenoid coil 46 pulls armature 45 into the coil 46 pivoting the print hammer 40 counterclockwise against the urging of spring 48 to strike the type slug 32 which has been positioned therebeneath, e.g. by sliding of type mounting member 33 to the left or right as viewed in FIGURE 2, driving type slug 32 downward to impress web 14 disposed therebelow, resulting in printing on surface 29 and deformation of surface 28. For normally urging or biasing hammer 40 in a clockwise direction, as viewed in FIGURE 2, a tension spring 48 is stretched between hammer 40 and suitable framework 49, which may be secured to or grounded on frame 37 as a bridge thereabove. When coil 46 is de-energized after a printing operation, spring 48 returns hammer 40 clockwise.

Where a plurality of sets of type are to be included in the printing mechanism, it may be advantageous to also provide a similar plurality of print hammers 40 and attentive equipment so that each set of type slugs is independently operable.

The deformation of surface 28 provides an image source which may be directed to a viewing screen. The optical means for picking up the image from the image source and for projection of the image are shown in FIGURE 1. Accordingly, projector lamp 52 is provided as a light source and a small, curved mirror reflector 53 reflects the light to a larger curved mirror reflector 54, which in turn is disposed to reflect the light, e.g. as a slightly converging beam, at a reflection angle through glass platen 17 at station 16.

As best seen in FIGURE 3, the light passes through platen 17 and layers 25 and 26 of web 14 and is reflected from the internally reflective surface 28. In the light reflected from surface 28, the deformed portion of surface 28 does not reflect a significant amount of light in the same direction as the beam reflected from the remainder of the surface, leaving a dark omission in the beam corresponding to the configuration of the deformation on the surface 28.

Returning to FIGURE 1, the beam reflected from the surface 28 is directed by an angularly disposed planar mirror 56 through a projection lens 57 spanning a port 58 through the top wall of casing 11. The beam from lens 58 is directed to angularly disposed planar mirror 59, mounted by a ball and socket 60 to a mounting bracket 61 which is secured to an overhead structure such as a ceiling. Mirror 59 directs the projected light beam to viewing screen 62, the image from surface 28 appearing on screen 62.

The mirrors 56 and 59 and the projection lens 57 function to provide proper disposition of the image on the screen 62 with respect to the printed matter on surface 29 of web 14, with lens 57 inverting the image. As a result, the top of the image on screen 62 corresponds to the top of the image on surface 29 as the image on surface 29 would be viewed looking down at web 14 from the left of and from above casing 11 in FIGURE 1, in the absence of the printing mechanism 18 otherwise obstructing the view of the web 14. The reflective surface 28, termed internally reflective herein, preferably provides shiny surface reflection in much the same manner as a regular mirror, although surfaces dependent to a significant degree on the angle of incidence and ratio of refractive indices at an interface may also be useful in the present system. It will be apparent that the light does not pass through the reflective surface 28 and none of the printing mechanism used for printing on surface 29 will be picked up in the image. Also, where manual score-keeping is employed, e.g. without printer 18, the score-keeper's hand will not be picked up in the image. Further, the projection can be continued while the image is being changed to include later score information, the image being projected directly from the position in which it is formed as an image source.

The upper surface 29 of web 14 may be provided with appropriate grid lines in the form of a score sheet grid registerable with the printing means 18 for printing scores in the correct positions. However, because such grid will not be picked up in the projection, a similar grid may be included between, within, or on a surface of any layer through which the light beam passes, e.g. as a lacquered grid on the top or bottom surface of platen 17, or as a printed grid on the lower surface of web 14, between layers 25 and 26, or as a grid painted on surface 28, e.g. with black ink, or where layer 29 is opaque as an omission in the reflective layer 27 or elsewhere. The desirability of registration of the grid on surface 29 with the grid picked up by the reflecting image conducting means will be apparent.

Although an electrical diagram is not included, the electrical energization of components of the device will be apparent to those in the art. The projection lamp 52 and a blower, if included in the device, are wired for electrical control in the usual manner for such lamps and blowers. Lines 47 of coil 46 are intended to be connected to a power source through a switch in line 47, with closing of the switch resulting in an individual printing operation. The switch may be manually operable or may be operated by a scoring system to close for a print operation and then reopen.

I claim:

1. A projection system comprising a supply of light-transmitting flexible solid web having an internal reflective permanently deformable surface, an image pick-up station, a light source, optical means for directing said light source to said image pick-up station, means mounting said supply web for feeding to said image pick-up station for reflecting from said internally reflective surface light directed to said station, printing means for mechanically deforming the internally reflective surface of said web at said station in a configuration to be projected and optical means for directing light reflected from the permanently deformed internally reflective surface at said station as a constant image to a viewing screen.

2. A pressure-sensitive lay up suitable to be written upon or printed upon to record a frequently changing bowling score legend, an image of which is adapted to be continuously projected to a viewing screen without showing the writing or printing means, comprising, a transparent relatively soft normally planar backing layer of plastic or the like adapted to be supported on a platen or the like, and a pliable normally planar layer of reflective material on the backing layer, both layers being deformable under pressure of a printing or writing means so that light directed through the backing layer to the reflective layer is reflected off the planar areas of the latter in substantially parallel rays adapted to be projected as lighted areas to a viewing screen, and light striking the deformed areas of the reflective layer is diffused to leave dark areas on the viewing screen providing an image of the legend impressed.

3. The lay up of claim 2 wherein said backing layer comprises a rigid layer supporting a pressure deformable layer, said rigid layer being generally nonformable under printing pressures transmitted through said surface and deformable layer.

4. The lay up of claim 2 including a layer of solid deformable material covering the obverse surface of said layer of reflective material.

5. The lay up of claim 4 wherein said covering layer is of an opaque material, is releasably bonded to the obverse surface of said layer of reflective material, and includes a free surface capable of receiving printing ink.

6. The lay up of claim 5 wherein said covering layer comprises a sub-surface layer including a multiplicity of pressure rupturable capsules containing printing ink and a paper surface layer disposed to receive ink from said capsules upon rupturing of said capsules by printing pressure applied to said capsules through said paper surface layer.

7. The lay up of claim 2 wherein said layer of reflective material comprises a thin layer of reflective aluminum, vapor-plated on said backing layer, and including a layer of pressure-sensitive self-marking record paper disposed on said aluminum layer of said laminate.

8. A roll of printing paper comprising an elongate web in roll form, said web comprising the lay up of claim 2.

9. A printing system which comprises a platen, a pressure printable sheet on said platen comprising the lay up of claim 2, having an outer layer including a print-receiving surface covering the obverse surface of said layer of reflective material and pressure printing means adapted to concurrently print on said print-receiving surface and deform said layer of reflective material.

10. A printing and projection system for impressing a frequently changing score legend and continuously projecting an image of the impressed legend to a viewing screen without showing on the screen an image of the means which impresses the legend, comprising, a transparent glass plate of substantially uniform thickness providing a platen upon which a record sheet may be supported for printing and projection; an opaque record sheet supported on said platen and comprising a laminate material including: a deformable layer of reflective metal between two layers of solid deformable material, one of said layers of solid deformable material being transparent and being bonded to a reflective surface of said layer of metal, the other of said layers of solid deformable material being an opaque material releasably bonded to the opposing surface of said layer of metal and including a multiplicity of pressure rupturable capsules containing printing ink and a paper surface layer disposed to receive ink from said capsules upon rupturing of said capsules by printing pressure applied to said capsules through said paper surface layer as a print receiving surface, said reflecting surface facing said platen; a pressure printing apparatus disposed adjacent the glass platen and adapted to selectively intermittently impress upon the exposed print receiving surface of the record sheet the frequently changing score legend while concurrently transmitting an impression of the legend into the sheet to deform the reflective surface; and an optical system including a light source, and means for directing light through the glass platen toward the reflecting surface together with means for projecting and directing the reflected image to a viewing screen.

11. A projection system comprising a light-transmitting platen, a pressure-deformable printable sheet disposed against said platen having an obverse printable surface and a reverse deformable reflective surface facing said platen adapted to be deformed by application of printing pressure during printing on the printable surface in the same pattern as printed on the printable surface, a light source located for impinging said reflective surface from the reflective surface side of the sheet for reflecting the image of deformation of said reflective surface from said reflective surface, and optical means for directing the light from said source through said platen to thusly impinge against the said reflective surface and for projecting the reflected image to a viewing screen.

12. A projection system as defined in claim 11 including printing means overlying said printable surface for mechanically deforming said reflective surface in a pattern defining the legend to be projected.

13. A projection system comprising a light transmitting platen, a pressure printable sheet disposed against the said platen and comprising a light transmitting backing adjacent to the platen and a deformable opaque reflective surface on the backing adapted to be deformed by application of presure throughout in a pattern providing an informational legend viewable through the backing, said backing, said backing comprising a pressure deformable layer supporting said reflective surface and a rigid layer supporting said pressure deformable layer and being substantially non-deformable under printing pressure transmitted through said reflective surface and deformable layer, a light source, optical means for directing light from said source through said platen and said backing and against said reflective surface for reflecting an image of the legend therefrom, and means for projecting the reflective image through a viewing screen.

14. A projection system as defined in claim 13 and including a layer of deformable opaque material over said surface.

15. A projection system as defined in claim 14 wherein the opaque material includes a free surface capable of receiving printing ink.

16. A projection system as defined in claim 15 wherein said opaque material includes a subsurface layer having pressure-rupturable capsules containing printing ink adapted to transfer to said free surface upon rupture of said capsules by application of printing pressure.

17. A projection system as defined in claim 15 including printing means overlying said sheet for printing on said free surface and deforming said reflective surface in a pattern defining the legend to be projected.

18. A printing and projection system for impressing a frequently changing score legend and continuously projecting an image of the changing legend to a viewing screen without showing on the screen an image of that which impresses the legend, comprising a transparent glass plate providing a platen upon which a record sheet may be supported for printing and projection; an opaque record sheet supported on said platen and comprising a laminate material including: a deformbale layer of reflective metal between two layers of solid deformable material, one of said layers of solid deformable material being transparent and attached to a reflective surface of said layer of metal, the other of said layers of solid deformable material being an opaque material attached to the opposing surface of said layer of metal and disposed to receive printing ink or the like, said reflecting surface facing said platen; and an optical system including a light source, and means for directing light through the glass platen toward the reflecting surface together with means for projecting an image reflected therefrom to a viewing screen.

19. A printing and projection system for impressing a frequently changing score legend and continuously projecting an image of the changing legend to a viewing screen without showing on the screen an image of the means which impresses the legend, comprising a transparent glass plate providing a platen upon which a record sheet may be supported for printing and projection; an opaque record sheet supported on said platen and comprising a laminate material including: a deformable layer of reflective metal between two layers of solid deformable material, one of said layers of solid deformable material being transparent and attached to a reflective surface of said layer of metal, the other of said layers of solid deformable material being an opaque material attached to the opposing surface of said layer of metal and disposed to receive printing ink or the like, said reflecting surface facing said platen; a printing apparatus disposed adjacent the glass platen and adapted to selectively intermittently impress upon the exposed print-receiving surface of the record sheet the frequently changing score legend while concurrently transmitting an impression of the legend into the sheet to deform the reflective surface; and an optical system including a light source, and means for directing light through the glass platen toward the reflecting surface together with means for projecting an image reflected therefrom to a viewing screen.

20. A method of projecting an image to a screen while producing a relatively permanent record thereof, which method comprises positioning at a light-receiving station a pressure deformable sheet of printable material having an obverse printable surface and a deformable reverse reflective surface, said sheet being sufficiently deformable to permit transfer of pressure printing from said printable surface therethrough for deforming said reflective surface responsive to pressure printing on said printable surface, impinging light upon said reflective surface on the reflective surface side of said sheet and reflecting an image of deformation of said reflective surface from said reflective surface to a viewing screen, and printing indicia on the printable surface from the printable surface side of said sheet to provide a permanent printed record thereof on said printable surface with the printed record pressure-transferred to said reflective surface as deformation thereof forming the image source on said reflective surface in the form of the pressure printed indicia while continuously projecting the image formed by directing light reflected from the reflective surface to the viewing screen.

References Cited
UNITED STATES PATENTS

| | | | |
|---|---|---|---|
| 1,037,515 | 9/1912 | Oeser | 161—214 |
| 2,061,942 | 11/1936 | Jones | 161—214 |
| 2,181,133 | 11/1939 | Katz | 88—24 |
| 2,283,268 | 5/1942 | Kreinin | 88—24 |
| 2,484,379 | 10/1949 | Goldberg | 88—24 |
| 2,596,721 | 5/1952 | Pentecost et al. | 101—18 |
| 2,604,006 | 7/1952 | Hartmann | 88—24 |
| 2,943,147 | 6/1960 | Glenn | 95—1.7 X |
| 3,124,064 | 3/1964 | Schick | 101—18 |

JOHN M. HORAN, *Primary Examiner.*

NORTON ANSHER, *Examiner.*

H. H. FLANDERS, *Assistant Examiner.*